United States Patent [19]

Morris

[11] 4,435,365
[45] Mar. 6, 1984

[54] PROCESS FOR PRODUCING TITANIUM TETRACHLORIDE

[75] Inventor: Alan J. Morris, Oklahoma City, Okla.

[73] Assignee: Kerr-McGee Chemical Corporation, Oklahoma City, Okla.

[21] Appl. No.: 377,334

[22] Filed: May 12, 1982

[51] Int. Cl.$^3$ ............................................. C01G 23/02
[52] U.S. Cl. ..................................... 423/76; 423/77; 423/75; 423/79; 423/82
[58] Field of Search ............... 423/74, 75, 76, 79, 423/82, 77

[56] References Cited

U.S. PATENT DOCUMENTS

| | | | |
|---|---|---|---|
| 2,701,179 | 2/1955 | McKinney | 23/87 |
| 2,701,180 | 2/1955 | Krchma | 23/87 |
| 3,418,074 | 12/1968 | Sargeant | 23/87 |
| 3,560,152 | 2/1971 | Dunham, Jr. et al. | 23/202 |
| 3,627,508 | 12/1971 | Hughes et al. | 423/75 |
| 3,848,051 | 11/1974 | Mas et al. | 423/79 |
| 3,897,537 | 7/1975 | Robinson et al. | 423/82 |
| 4,014,976 | 3/1977 | Adachi et al. | 423/79 |
| 4,019,898 | 4/1977 | Chen et al. | 423/82 |
| 4,038,364 | 7/1977 | Lailach | 423/82 |
| 4,085,189 | 4/1978 | Dunn, Jr. | 423/74 |
| 4,183,899 | 1/1980 | Bonsack | 423/79 |
| 4,199,552 | 4/1980 | Rado | 423/82 |
| 4,201,570 | 5/1980 | Fitch et al. | 75/1 |
| 4,288,415 | 9/1981 | Rahm et al. | 423/82 |
| 4,288,416 | 9/1981 | Davis et al. | 423/82 |

Primary Examiner—Herbert T. Carter
Attorney, Agent, or Firm—William G. Addison

[57] ABSTRACT

A process for producing titanium tetrachloride in which iron-titanium ore is leached in hydrochloric acid to produce a solid phase comprising upgraded titanium-containing material, and a spent liquid phase. Dissolved metal chlorides in the spent liquid phase are regenerated to produce hydrochloric acid in an acid regeneration zone. The titanium-containing material is chlorinated to produce a product stream containing titanium tetrachloride and entrained solids, including metal chloride. The entrained solids are recovered from the product stream and the metal chloride portion thereof is recycled to the acid regeneration zone.

8 Claims, 3 Drawing Figures

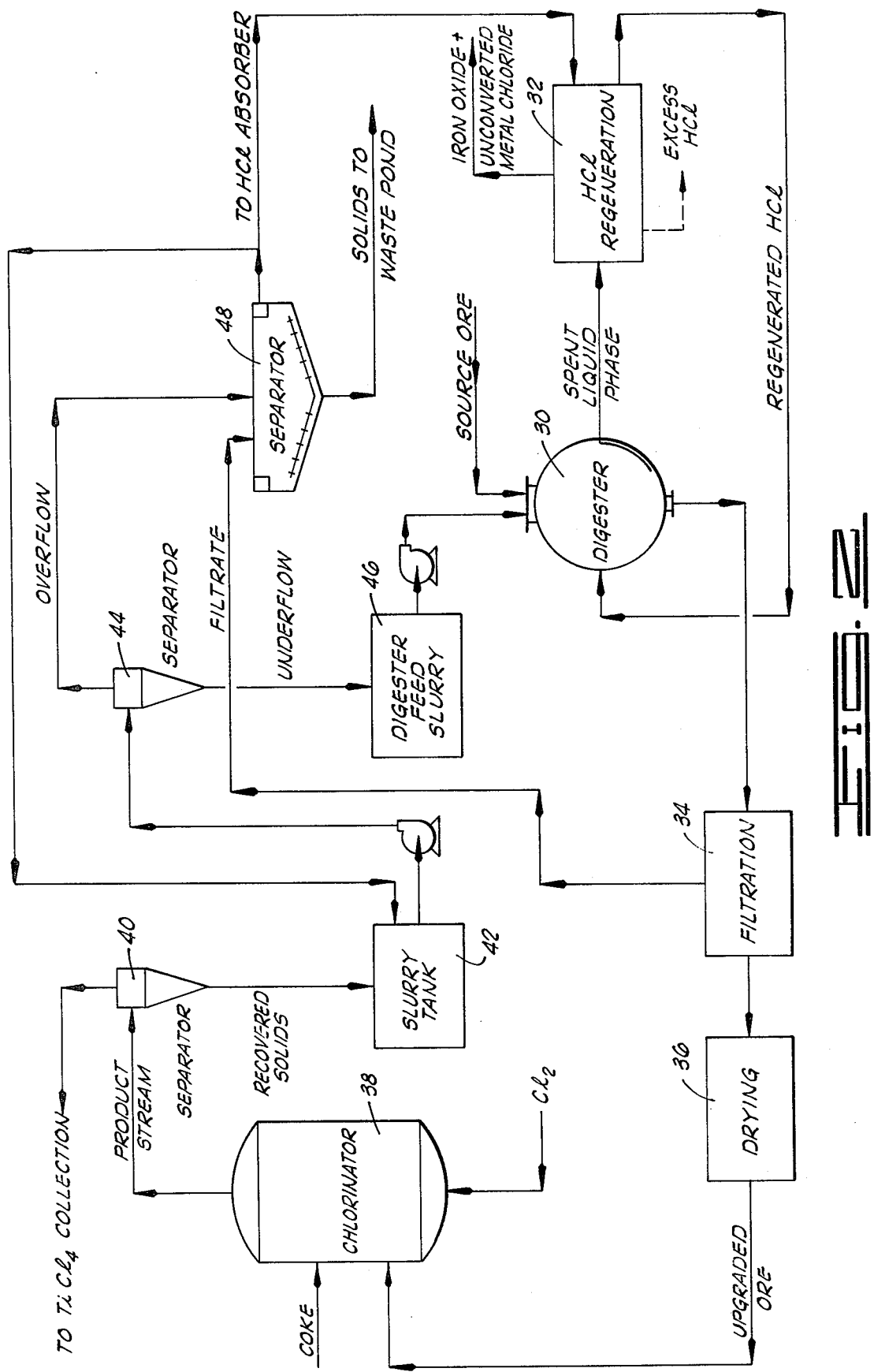

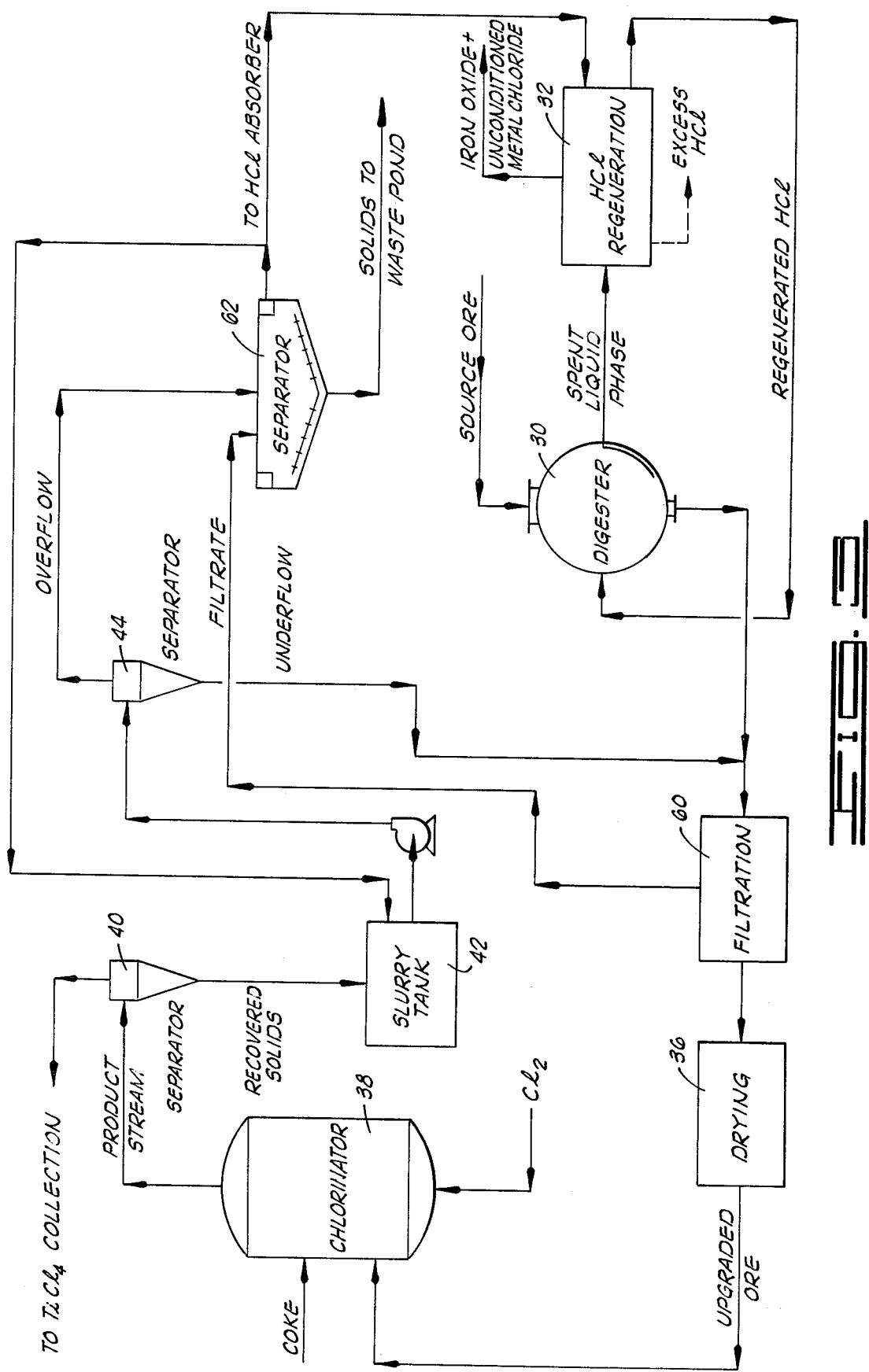

PROCESS FOR PRODUCING TITANIUM TETRACHLORIDE

FIELD OF INVENTION

The present invention relates to processes for producing titanium tetrachloride, and more particularly to processes for producing titanium tetrachloride in which a leaching process is used to upgrade an iron-titanium ore prior to a chlorination step.

BRIEF DESCRIPTION OF THE DRAWINGS

FIG. 2 shows a schematic diagram of the flow of materials in another embodiment of the process of the present invention, in which the recovered entrained solids are subjected to a separation step prior to recycling of metal chlorides in accordance with the present invention.

FIG. 3 shows a schematic diagram of the flow of materials in another embodiment of the process of the present invention, in which the recovered entrained solids are subjected to a separation step prior to recycling of the metal chlorides in accordance with the present invention.

DESCRIPTION OF THE PREFERRED EMBODIMENT

Figure 1:
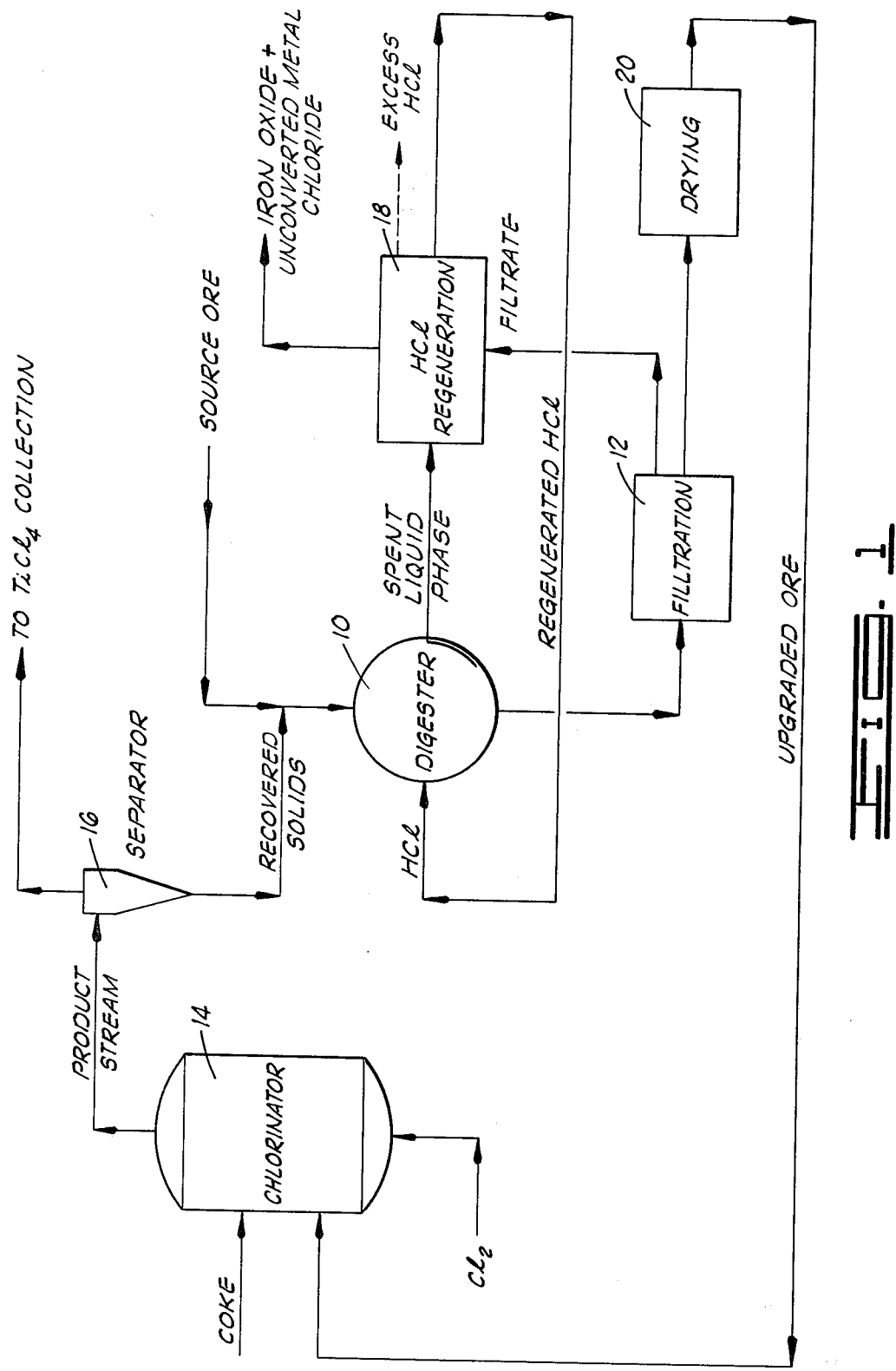
FIG. 1 shows a schematic diagram of the flow of materials in the process of the present invention.

With reference to FIG. 1, the process of the present invention generally comprises leaching a reduced iron-titanium ore in a digestion zone 10 with dilute hydrochloric acid, to produce a spent liquid phase and a solid phase comprising upgraded titanium-containing material. The solid phase is separated from the liquid phase, and is thereafter transported to a filtration zone 12, where residual traces of metal chlorides are removed by washing with water. The solid phase is then transported to a reaction zone 14. A carbonaceous reducing agent is added to the reaction zone 14, and the carbonaceous reducing agent and the titanium-enriched solid phase form a bed, through which chlorine gas is passed at elevated temperatures.

The reaction between the chlorine, the titanium-enriched solid phase and the reducing agent produces a product stream containing titanium tetrachloride. Particulate solids, including unreacted ore, unburned carbonaceous reducing agent, and metal chlorides are also entrained in this product stream flowing from the reaction zone 14. In the separation zone 16 the entrained solids are separated from the titanium tetrachloride. The entrained solids, or at least the metal chlorides contained therein, are then recycled to the digestion zone 10.

As will be discussed in greater detail hereafter, recycling of the entrained solids to the digestion zone reduces external hydrochloric acid requirements for the process, since metal chlorides from the entrained solids may be recovered from the digestion zone 10 and reacted in a regeneration step to form hydrochloric acid. Further, the recycling step reduces the cost of producing titanium tetrachloride by eliminating the necessity of installing separate equipment for neutralizing, filtering and drying waste solids recovered from the product stream. With this overview, a more detailed description of the present invention will be provided.

With continued reference to FIG. 1, the digestion zone 10 preferably comprises a digester, in which is received iron-titanium ore, such as ilmenite, which is preferably crushed. Prior to reception in the digestion zone 10, the iron-titanium ore is preferably subjected to a reducing agent, under such conditions as to reduce a substantial amount of the iron to a lower oxidation state. For example, this reducing step may be carried out by roasting iron-titanium ore with hydrogen, carbon monoxide or a carbonaceous oil under reducing conditions; a reducing reaction carried out at temperatures between about 700° C. and 1000° C. for periods of between about 15 minutes and about 100 minutes will be satisfactory for purposes of the present invention. Reduction of the oxidation state of the iron in the ore, either to ferrous or elemental iron, improves the extractive efficiency of the leaching step to be described hereafter. The iron-titanium ore may also be subjected to pre-oxidation, as by roasting under oxidative conditions, prior to the reducing step just described.

The iron-titanium ore, preferably substantially reduced as described above, is received in the digestion zone 10, where it is leached with an aqueous hydrochloric acid solution. The aqueous hydrochloric acid solution is preferably dilute; for example, a concentration of approximately 15% to 22% hydrochloric acid, with a 20% excess over the amount required to react with the iron in the ore received in the digestion zone, is satisfactory for purposes of the present invention. The leaching step is preferably carried out at elevated temperatures, such as between about 100° C. and about 150° C., and preferably lasts between about 3 and about 8 hours. During the leaching process, the hydrochloric acid is expended and extracts iron from the iron-titanium ore into the liquid phase, leaving a solid phase comprising upgraded titanium-containing material. If the source material is ilmenite, the upgraded titanium-containing material will be a synthetic rutile, containing titanium dioxide.

The spent liquid phase produced in the leaching step is decanted from the digestion zone 10, and is transported to an acid regeneration zone 18, where chloride and iron ions are reacted at elevated temperatures, such as approximately 700° C., in the presence of air and water to produce hydrogen chloride and iron oxide. The hydrogen chloride produced by this step, which is in gaseous form, is further treated in an absorber with an aqueous absorbent, which contains small amounts of dissolved metal chlorides. The gaseous hydrogen chloride is absorbed by the absorbent to produce hydrochloric acid.

The iron oxide produced in the acid regeneration zone 18, together with any unconverted metal chlorides, are conventionally recovered as solid waste; the hydrochloric acid produced in the acid regeneration zone 18 is recycled to the digestion zone 10 for use in leaching additional quantities of iron-titanium ore which are received in the digestion zone 10. Even though the acid regeneration process is not 100% efficient, enough hydrochloric acid will ordinarily be produced in the acid regeneration zone 18 to satisfy the acid requirements of the digestion zone 10; excess hydrochloric acid, not required for leaching, is withdrawn from the acid generation zone 18 and directed to other uses. If the acid production level of the acid regeneration zone 18 is not suffcient, make-up hydrochloric acid may be added to the recycled hydrochloric acid, in order to maintain the acid concentration in the digestion zone 10 at the required level.

After the spent liquid phase is decanted from the solid phase in the digestion zone 10, the solid phase is transported to the filtration zone 12. Preferably the solid phase is formed into a slurry by addition of a quantity of dilute recycled aqueous hydrochloric acid solution to the digestion zone 10. This slurry is then transported to the filtration zone 12 by conventional pipeline and pumping apparatus.

In the filtration zone 12, the solid phase, comprising upgraded titanium-containing material, is washed with water to remove any remaining traces of metal chlorides. The filtrate thus produced may be recycled by a conduit to the acid regeneration zone 18, where the filtrate may be used as an absorbent for hydrogen chloride gas. After filtration is completed, the solid phase is transported from the filtration zone 12 to the drying zone 20, where it is dried. The solid phase is then transported to the reaction zone 14, which preferably comprises a chlorination reactor.

The upgraded titanium-containing material is introduced into the reaction zone 14; also introduced into the reaction zone 14 is a carbonaceous reducing agent such as coke. The ungraded titanium-containing material, the carbonaceous reducing agent, or both, may be preheated to elevated temperatures before introduction to the reaction zone 14. A stream of chlorine gas passes through the mixture of carbonaceous reducing agent and upgraded titanium-containing material, while the reaction zone 14 is maintained at elevated temperatures. The bed of carbonaceous reducing agent and upgraded titanium-containing material is preferably fluidized by the stream of chlorine gas, in order to promote the greatest possible reactive contact between the chlorine and the material introduced in the reaction zone 14.

The reaction between the chlorine gas and the upgraded-titanium-containing material and carbonaceous reducing agent produces chlorides such as titanium tetrachloride and iron and other metal chlorides, and gaseous components such as oxygen, carbon dioxide and carbon monoxide. The product stream released from the reaction zone will contain these compounds either in gaseous form or as entrained solids, together with any unreacted chlorine, entrained unreacted reducing agent, and entrained unreacted titanium-containing materials.

The product stream from the reaction zone 14 is carried to the separation zone 16, which preferably comprises a cyclone, where the entrained solids, including metal chlorides, are recovered. After the gaseous portion of the product stream passes through the separation zone 16, the titanium tetrachloride in the product stream is recovered and collected by conventional methods.

With continued reference to FIG. 1, the recovered entrained solids from the separation zone 16, preferably comprising the cyclone underflow, are transferred to the digestion zone 10. In the embodiment of FIG. 1, all recovered entrained solids are recycled to the digestion zone 10; in other embodiments, as will be described hereafter with reference to FIGS. 2 and 3, only a portion of the recovered entrained solids are recycled.

As shown in FIG. 1, the recovered entrained solids, including unreacted titanium-containing material, unreacted reducing agent, and metal chlorides, are combined with source ore, such as reduced ilmenite, in the digestion zone 10. The metal chlorides from the recovered entrained solids will be decanted from the digestion zone 10 and transferred to the acid regeneration zone 18. Chloride ions so transferred may be used to advantage in the acid regeneration step previously described. The availability of these chloride ions reduces the requirements for make-up hydrochloric acid in the process and thus enhances the degree of resource utilization and economic efficiency of the process of the present invention.

Recycling of the recovered entrained solids to the digestion zone 10 offers the further advantage of eliminating the need for a separate system for treatment of the recovered entrained solids. If these solids are not recycled, it is necessary to provide potentially expensive facilities in order to neutralize and pond these solids. By recycling the waste solids, the metal chlorides may report to the spent liquid phase to the leaching step, and may be processed thereafter in the acid regeneration step, with the chloride being converted to a hydrochloric acid, and the metal ions being converted to metal oxides and reporting with the iron oxide product of the acid regeneration step. The remaining recovered entrained solids, such as unreacted titanium-containing material and unreacted reducing agent, will report to the solid phase produced in the leaching step, and will be filtered and dried, and thereafter recycled to the reaction zone 14. Since all of the constituents of the recovered entrained solids may be treated in the leaching, acid regeneration, filtration, drying and chlorination steps, the recycling step eliminates the need for separate processing of the entrained solids recovered in the separation zone 16; this features provides the process of the present invention with significant economic advantages.

It will also be noted that much of the unreacted titanium-containing material and reducing agent particles collected as entrained solids and introduced into the digestion zone 10 will be substantially finer than the source ore particles introduced into the digestion zone 10. These titanium-containing material and reducing agent particles may serve as a substrate for precipitation of titanium from solution in the digestion zone 10. This precipitation will densify the particles and thus render them less likely to leave with the product stream once they are returned to the reaction zone 14.

In the embodiment shown in FIG. 1, the separation zone 16 is shown in close geographical proximity to the digestion zone 10; however, it will be recognized that the digestion zone 10 may be disposed at a remote location relative to the separation zone 16; in this event, conventional waste solids handling, loading and transportation systems may be employed to move recovered entrained solids from the separation zone 16 to the digestion zone 10.

FIG. 2 illustrates the flow of materials in another embodiment of the present invention. In this embodiment, much of the unreacted titanium-containing material and unreacted reducing agent is separated from the recovered entrained solids before the remaining solids are recycled to the digestion zone 10.

The basic steps in the process depicted in FIG. 2 are similar to those previously described with reference to FIG. 1. Iron-titanium ore, preferably an ore reduced as described previously with reference to FIG. 1, is introduced into a digestion zone 30. The ore is leached with hydrochloric acid to produce a solid phase comprising titanium-containing material and a spent liquid phase. The spent liquid phase is decanted from the digestion zone 30 and is transported to an acid regeneration zone 32, where it is treated to produce hydrochloric acid and metal oxides. The hydrochloric acid is recycled to the digestion zone 30. Excess acid, not required for the leaching step, is withdrawn from the acid regeneration zone 32 and directed to other uses. Metal oxides, together with any unconverted metal chlorides, are recovered as solid waste.

After the solid phase produced in the leaching step is separated from the spent liquid phase, it is washed and filtered in a filtration zone 34; the filtrate from this step is transported, preferably by conventional piping and pumping apparatus, to a third separation zone 48 to be described hereafter. After completion of the filtration step, the solid phase is dried in a drying zone 36, and is then transported to a reaction zone 38 where it is combined with a carbonaceous reducing agent at elevated temperatures, and is contacted with a stream of chlorine gas. The product stream produced in the reaction zone 38 contains entrained solids, which are recovered from the product stream in the first separation zone 40. All of the foregoing steps are identical to those previously discussed with reference to FIG. 1, and will not be redescribed in detail.

With continued reference to FIG. 2, the entrained solids recovered in the separation zone 40 are combined with water to form a slurry. Alternatively, the entrained solids may be combined with overflow liquid from the third separation zone 48, to be described hereafter. This slurry-forming step may be accomplished in a slurry tank 42. The metal chlorides contained in the entrained solids will be dissolved in the liquid phase of the slurry. The slurry containing the recovered entrained solids is transported to a second separation zone 44, preferably by a pipeline and conventional pumping apparatus.

The second separation zone 44 preferably comprises a hydroclone, in which the slurry is separated into two portions: a first, or overflow portion, which is rich in dissolved metal chlorides, fine particles of unreacted reducing agent, and fine particles of unreacted ore and silica from the upgraded titanium-containing material; and a second, or underflow portion, which is rich in coarser particles of unreacted reducing agent, and in the non-siliceous particles of unreacted ore.

The second portion of the slurry is transported from the second separation zone 44 to the digestion zone 30, which will thus effect recycling of the unreacted non-siliceous particles of titanium-containing material and the coarser unreacted particles of reducing agent. These particles will return to the reaction zone 38 after the leaching, filtration and drying steps. In the reaction zone 38, the particles may contribute to the chlorination reaction previously described.

If necessary, the second portion of the slurry may be held in a slurry tank 46 after it leaves the second separation zone 44; the second portion of the slurry may then be transported to the digestion zone 30, by conventional pipeline and pumping apparatus, as required.

It will be noted that the process depicted in FIG. 2 predominantly recycles only those particles which can participate in the chlorination reaction carried out in the reaction zone 38. Substances which are not required for the chlorination reaction, such as silica, fine particles of unreacted reducing agent, and dissolved metal chlorides, are separated into the first or overflow portion of the slurry produced from the recovered entrained solids. This separation avoids unnecessary buildup of unreactive substances in the reaction zone 38.

The first portion of the slurry produced from the recovered entrained solids is transported, by conventional piping and pumping apparatus, to a third separation zone 48, which preferably comprises a thickener. In the third separation zone 48 the slurry is separated into a solid phase, which contains silica and fine particles of unreacted reducing agent, and a liquid phase, which contains dissolved metal chlorides. The solid phase is transported to a waste disposal area, such as a waste pond. A portion of the liquid phase is returned to the slurry tank 42, by conventional pipeline and pumping apparatus. The remainder of the liquid phase is transported, by conventional pumping and piping apparatus, to the hydrogen chloride absorber in the acid regeneration zone 32. Here, the liquid phase produced in the third separation zone 48 may be used as an absorbent for hydrogen chloride produced in the acid regeneration step.

From the foregoing description, it will be appreciated that, in the embodiment of FIG. 2, the metal chlorides recovered from the recovered entrained solids in solution, are first used as an absorbent for gaseous hydrogen chloride in the acid regeneration step. The hydrochloric acid thus produced will contain dissolved metal chlorides, which will next be introduced into the digestion zone with the regenerated acid. After leaching is complete, the metal chlorides will be transferred with the spent liquid phase to the acid regeneration zone, where the metal chlorides are then used as a source of gaseous hydrogen chloride. In contrast, in the embodiment shown in FIG. 1, the metal chlorides are directly recycled for use as source material for the gaseous hydrogen chloride, which is produced prior to the absorption step.

FIG. 3 shows another embodiment of the present invention. In the embodiment of FIG. 3, the digestion zone, acid regeneration zone, filtration zone drying zone, reaction zone, and first, second and third separation zones are arranged in essentially the same way as previously described with reference to FIG. 2. Likewise, the digestion, acid regeneration, filtration, drying, reaction and first, second and third separation steps are carried out in essentially the same way as previously described; the description for these steps will not be repeated here.

In the embodiment of FIG. 3, the second portion of the slurry, containing coarser particles of unreacted reducing agent and non-siliceous particles of titanium-containing material, is transported to the filtration zone 60, rather than to the digestion zone, as in FIG. 2. In the filtration zone 60, the second portion of the slurry, together with the solid phase received from the digestion zone, are washed with water to remove residual traces of dissolved metal chloride. The filtrate from this filtration step is then recycled to the third separation zone 62, as previously described with reference to FIG. 2. From the third filtration zone 62, the aqueous solution of metal chlorides is transported to the acid regeneration zone, where it is used as an absorbent for gaseous hydrogen chloride.

In the embodiment shown in FIG. 3, the amount of dissolved metal chlorides in the second portion of the slurry is relatively small, because most of the dissolved metal chlorides are drawn into the first portion of the slurry, which is treated in the third separation zone 62. Thus, the dissolved metal chlorides can be adequately removed from the recycled reducing agent and titanium-containing material in the filtration step. When greater quantities of dissolved metal chlorides are present in the recycled solids, as in the embodiment shown in FIG. 1, it is preferable to recycle the solids into the digestion zone, since the leaching and decanting process previously described is better adapted to removing larger quantities of dissolved metal chlorides than is the filtration process.

From the foregoing description, it will be appreciated that the process of the present invention provides for recovery of metal chlorides from the entrained solids produced by chlorination of titanium-containing material. Once recovered, these metal chlorides are used to regenerate hydrochloric acid used to leach iron-titanium ore; this leaching produces the upgraded material used in the chlorination reaction. The recycling enhances the economic efficiency and degree of resource utilization available in processes for the production of titanium tetrachloride.

Changes may be made in the construction, operation and arrangement of the various parts, elements, steps and procedures described herein without departing from the spirit and scope of the invention as defined in the following claims.

What is claimed is:

1. In a process for producing titanium tetrachloride from an iron-titanium ore wherein said ore is subjected to a leaching step where, in a digestion zone, said ore is leached, at elevated temperatures, with a leach liquor containing hydrochloric acid to produce a solid phase of upgraded titanium-containing material and a spent liquid phase containing dissolved metal chlorides; a first separation step wherein said solid phase and said spent liquid phase are separated; an acid regeneration step where, in an acid regeneration zone, the metal chlorides dissolved in the spent liquid phase are reacted at elevated temperatures in the presence of air and water to produce hydrochloric acid; a chlorination step where, in a chlorination zone, said separated solid phase is chlorinated in the presence of a carbonaceous reducing agent at elevated temperatures to produce a product stream containing a titanium tetrachloride phase and an entrained solids phase, said entrained solids phase containing metal chlorides, unreacted upgraded titanium-containing material and unreacted reducing agent and a second separation step wherein said titanium tetrachloride phase is separated from said entrained solids phase, the improvements which comprise:

combining said entrained solids phase with a liquid mdium consisting of water or leach liquor containing hydrochloric acid and additional iron-titanium ore to dissolve said metal chlorides in said medium and to suspend said unreacted titanium-containing material and unreacted reducing agent in said medium;

separating said liquid medium into a liquid phase containing dissolved metal chlorides and a solid phase containing unreacted titanium-containing material and unreacted reducing agent from the chlorination product stream;

recovering chlorine values from said dissolved metal chlorides in said liquid phase as hydrochloric acid by reaction of said metal chlorides in said acid regeneration zone; and recovering titanium values from said unreacted titanium-containing material and unreacted reducing agent in said solids phase as titanium tetrachloride by chlorinating said unreacted titanium-containing material in said chlorination zone.

2. The improvements of claim 1 which comprise recycling the entrained solids phase of the chlorination product stream to the digestion zone of the leaching step wherein said entrained solids phase is combined with a liquid medium comprising leach liquor containing hydrochloric acid and additional iron-titanium ore to dissolve said metal chlorides and to suspend said unreacted titanium-containing material and unreacted reducing agent therein.

3. The improvements of claim 1 wherein said metal chlorides dissolved in said liquid phase are reacted with air and water to produce hydrogen chloride, said hydrogen chloride then being contacted with an absorbent to produce hydrochloric acid.

4. The improvements of claim 1 which comprise combining the entrained solids phase of the chlorination product stream with a liquid medium comprising water to dissolve the metal chlorides and to suspend said unreacted titanium-containing material and unreacted reducing agent therein.

5. The improvements of claim 4 wherein said metal chlorides dissolved in said liquid phase are reacted with air and water to produce hydrogen chloride said hydrogen chloride then being contacted with an absorbent to produce hydrochloric acid.

6. The improvements of claim 4 wherein said solid phase containing unreacted titanium-containing material and unreacted reducing agent from the chlorination product stream is combined with additional upgraded titanium-containing material from said leaching step, washed, filtered and dried and recycled to the chlorination zone to recover the titanium values of said unreacted titanium-containing material from the chlorination product stream as titanium tetrachloride.

7. The improvements of claim 4 wherein said solid phase containing unreacted titanium-containing material and unreacted reducing agent is recycled to the digestion zone and combined with additional iron-titanium ore to produce a particulate leach product of upgraded titanium-containing material containing said solid phase.

8. The improvements of claim 7 wherein said particulate leach product containing said solid phase is washed, filtered and dried and recycled to the chlorination zone to recover the titanium values of the unreacted titanium-containing material from the chlorination product stream in said solid phase as titanium tetrachloride.

* * * * *